United States Patent
Shi et al.

(10) Patent No.: US 12,006,447 B2
(45) Date of Patent: Jun. 11, 2024

(54) EPOXY CONDUCTIVE PASTE AND PREPARATION METHOD AND APPLICATION THEREOF

(71) Applicant: Soltrium Advanced Materials Technology, Ltd, Shenzhen (CN)

(72) Inventors: Wen Shi, Shenzhen (CN); Fengzhen Sun, Shenzhen (CN); Delin Li, San Jose, CA (US)

(73) Assignee: Soltrium Advanced Materials Technology, Ltd

( * ) Notice: Subject to any disclaimer, the term of this patent is extended or adjusted under 35 U.S.C. 154(b) by 143 days.

(21) Appl. No.: 17/413,564

(22) PCT Filed: Jan. 17, 2020

(86) PCT No.: PCT/CN2020/072632
§ 371 (c)(1),
(2) Date: Jun. 13, 2021

(87) PCT Pub. No.: WO2021/142748
PCT Pub. Date: Jul. 22, 2021

(65) Prior Publication Data
US 2022/0348799 A1    Nov. 3, 2022

(51) Int. Cl.
| | | |
|---|---|---|
| *C09J 11/04* | (2006.01) | |
| *C08K 3/08* | (2006.01) | |
| *C08K 5/5415* | (2006.01) | |
| *C08K 7/00* | (2006.01) | |
| *C08K 9/02* | (2006.01) | |
| *C09J 9/02* | (2006.01) | |
| *C09J 11/06* | (2006.01) | |
| *C09J 163/00* | (2006.01) | |

(52) U.S. Cl.
CPC ............ *C09J 11/04* (2013.01); *C08K 3/08* (2013.01); *C08K 5/5415* (2013.01); *C08K 7/00* (2013.01); *C08K 9/02* (2013.01); *C09J 9/02* (2013.01); *C09J 11/06* (2013.01); *C09J 163/00* (2013.01); *C08K 2003/0806* (2013.01); *C08K 2003/085* (2013.01); *C08K 2201/001* (2013.01); *C08K 2201/005* (2013.01)

(58) Field of Classification Search
CPC . C09J 11/04; C09J 11/06; C09J 163/00; C09J 9/02; C08K 3/08; C08K 9/02; C08K 5/5415; C08K 7/00; C08K 2003/0806; C08K 2003/085; C08K 2201/001; C08K 2201/005
USPC .......................................................... 524/403
See application file for complete search history.

(56) References Cited

FOREIGN PATENT DOCUMENTS

CN        105238314 A  *  1/2016

OTHER PUBLICATIONS

Translation of CN 105238314, Jan. 13, 2016. (Year: 2016).*

* cited by examiner

*Primary Examiner* — Hui H Chin
(74) *Attorney, Agent, or Firm* — Fang Wu

(57) ABSTRACT

An epoxy conductive paste is disclosed, based on 100 parts by total mass, comprising the following raw material components: 30~81 parts of conductive particles, 16~30 parts of epoxy, 0.2~3 parts of acrylic, 1~15 parts of reactive diluent, 1~15 parts of toughening agent, 0.4~5 parts of silane coupling agent, and 0.4~5 parts of cationic curing agent; wherein, the conductive particles include conductive particles with a three-dimensional dendritic microstructure. The conductive paste of the disclosure has the characteristics of good conductivity, short curing time, strong adhesion, and capability for long-term operation at room temperature.

18 Claims, 8 Drawing Sheets

EPOXY CONDUCTIVE PASTE AND PREPARATION METHOD AND APPLICATION THEREOF

CROSS-REFERENCES TO RELATED APPLICATIONS

This application is a national-phase application of and claims priority to PCT Patent Application No. PCT/CN2020/072632, filed on Jan. 17, 2020, commonly assigned to Soltrium Advanced Materials Technology, Ltd. Shenzhen with U.S. application Ser. No. 17/413,563, filed concurrently on Jun. 13, 2021, and U.S. application Ser. No. 17/413,565, filed concurrently on Jun. 13, 2021, which are incorporated by reference herein for all purposes.

BACKGROUND OF THE INVENTION

The disclosure belongs to the technical field of conductive adhesives for semiconductors, and specifically relates to an epoxy conductive paste and a preparation method and application thereof.

Conductive pastes are widely used in the manufacture and assembly of electronic equipment, integrated circuits, semiconductor devices, passive components, solar cells, solar modules and/or light-emitting diodes. Because the conductive paste provides mechanical bonding and electrical conduction paths between the two surface components, the conductive paste must have good mechanical properties and low resistance electrical conductivity.

Generally, conductive paste formulations consist of conductive particles, polymers, and additives. The polymers usually provide a mechanical bond between two components, while conductive particles usually provide the required electrical conduction path. In addition, the morphologies of conductive particles used in traditional conductive pastes are mostly spherical, spheroidal and flaky silver particles, which leads to the contact between the two conductive particles to be a point contact. For example, as shown in FIG. 1, the contact between two spherical conductive particles is a point contact.

In order to improve the conductive performance of the conductive paste, a traditional method of increasing the number or dosage of conductive particles is usually adopted. However, this method inevitably increases the production cost of the conductive paste while increasing the conductivity. Moreover, the existing conductive paste has a long curing time during use, and the adhesion of the conductive paste is poor.

Therefore, in order to solve the problems of poor conductivity, longer curing time, and poor adhesion of existing conductive pastes, it is desired to develop an improved acrylic conductive paste.

BRIEF SUMMARY OF THE INVENTION

The present disclosure relates to the technical field of semiconductor materials, and with an objective to provide an epoxy conductive paste and a preparation method and application thereof.

In order to achieve the above objectives, the technical scheme of the present disclosure is realized in some embodiments as follows: an epoxy conductive paste, based on 100 parts by total mass, including the following raw materials: 30~81 parts of conductive particles, 16~30 parts of epoxy, 0.2~3 parts of acrylic, 1~15 parts of reactive diluent, 1~15 parts of toughening agent, 0.4~5.0 parts of silane coupling agent, 0.4~5.0 parts of cationic curing agent. Herein, the conductive particles in the conductive paste include particles with a three-dimensional dendritic microstructure.

The conductive paste according to some embodiments of the present disclosure is a heat-curing conductive paste. When used, it is found that the conductive paste can be cured at a temperature of 80° C.-170° C. within 1 to 500 seconds, and the conductive paste can also be stored at a room temperature of 22° C. to 25° C. for a long time. It shows that the conductive paste according to some embodiments of the present disclosure can be operated for a long time under room temperature conditions, and further shows that the conductivity of the conductive paste is sufficient for long-term use under operation conditions of various electronic device assembly including solar photovoltaic module production. The conductive paste of the present disclosure can also form a conductive path between two substrates or components and the substrate, and can be used in the manufacture and assembly of electronic equipment, integrated circuits, semiconductor devices, passive components, and solar photovoltaic modules.

In some embodiments, the specific surface area of the conductive particles with a three-dimensional dendritic microstructure in the conductive paste is limited within 0.2~3.5 $m^2/g$.

In some embodiments, the conductive particles with a three-dimensional dendritic microstructure are silver particles with a three-dimensional dendritic microstructure or silver-coated copper particles with a three-dimensional dendritic microstructure.

In addition, if a conductive paste contains only three-dimensional dendritic conductive particles, the viscosity of the conductive paste may increase, and even the printability of the conductive paste may be affected. Therefore, in order to reduce the viscosity of the epoxy conductive adhesive to maintain printability on the basis of ensuring that the conductivity of the epoxy conductive adhesive does not change significantly, the conductive particles in the epoxy conductive paste of the present disclosure also include at least 5% of one or a combination of more of spherical conductive particles, flaky conductive particles, or spheroidal conductive particles.

Optionally, the conductive particles are a mixture of spherical silver particles and silver particles with a three-dimensional dendritic microstructure. In the embodiment, a ratio of the weight of the silver particles with a three-dimensional dendritic microstructure to the total weight of the conductive particles is one selected from (0.05~0.95):1. That is, the epoxy conductive paste of the present disclosure contains silver particles with a three-dimensional dendritic microstructure with a mass ratio in the conductive particles being 0.05:1; or 0.95:1; or 0.7:1, etc. In addition, the specific surface area of the silver particles with three-dimensional dendritic microstructure is limited within 0.2~3.5 $m^2/g$, and the size of the spherical silver particles is selected from a range of 0.1 μm~50.0 μm.

Optionally, the conductive particles are a mixture of spherical silver particles and silver-coated copper particles with a three-dimensional dendritic microstructure. In the embodiment, the mass ratio of the silver-coated copper particles with a three-dimensional dendritic microstructure in the conductive particles is one selected from (0.05~0.95):1. In the embodiment, the epoxy conductive paste of the present disclosure contains silver-coated copper particles with a three-dimensional dendritic microstructure with a mass ratio in the conductive particles being 0.05:1; or 0.95:1; or 0.7:1, etc. In addition, the specific surface area of the silver particles with three-dimensional dendritic microstructure is limited within 0.2~3.5 m²/g, and the size of the spherical silver particles is varied in a range of 0.1 μm~50.0 μm.

Optionally, the conductive particles are a mixture of flaky silver particles and silver particles with a three-dimensional dendritic microstructure. In the embodiment, the mass ratio of the silver particles with a three-dimensional dendritic microstructure in the conductive particles is one selected from (0.05~0.95):1. In the embodiment, the epoxy conductive paste of the present disclosure contains silver particles with a three-dimensional dendritic microstructure with a mass ratio in the conductive particles being 0.05:1; or 0.95:1; or 0.7:1, etc. In addition, the specific surface area of the silver particles with three-dimensional dendritic microstructure is limited within 0.2~3.5 m²/g, and the size of the flaky silver particles is varied in a range of 0.1 μm~50.0 μm.

Optionally, the conductive particles are a mixture of flaky silver particles and silver-coated copper particles with a three-dimensional dendritic microstructure. In the embodiment, the mass ratio of the silver-coated copper particles with a three-dimensional dendritic microstructure in the conductive particles is one selected from (0.05~0.95):1. In the embodiment, the epoxy conductive paste of the present disclosure contains silver-coated copper particles with a three-dimensional dendritic microstructure with a mass ratio in the conductive particles being 0.05:1; or 0.95:1; or 0.7:1, etc. In addition, the specific surface area of the silver-coated copper particles with three-dimensional dendritic microstructure is limited within 0.2~3.5 m²/g, and the size of the flaky silver particles is varied in a range of 0.1 μm~50.0 μm.

Optionally, the conductive particles are a mixture of flaky silver-coated copper particles and silver-coated copper particles with a three-dimensional dendritic microstructure. In the embodiment, the mass ratio of the silver-coated copper particles with a three-dimensional dendritic microstructure in the conductive particles is one selected from (0.05~0.95):1. In the embodiment, the epoxy conductive paste of the present disclosure contains silver-coated copper particles with a three-dimensional dendritic microstructure with a mass ratio in the conductive particles being 0.05:1; or 0.95:1; or 0.7:1, etc. In addition, the specific surface area of the silver-coated copper particles with three-dimensional dendritic microstructure is limited within 0.2~3.5 m²/g, and the size of the flaky silver-coated copper particles is varied in a range of 0.1 μm~50.0 μm.

Optionally, the conductive particles are a mixture of spherical silver particles, flaky silver particles, and silver particles with a three-dimensional dendritic microstructure, wherein a ratio of the flaky silver particles in the total mass of the spherical silver particles and the flaky silver particles is one selected from (0.3~0.7):1. The epoxy conductive paste of the present disclosure contains flaky silver particles and spherical silver particles, and the ratio of the weight of the flaky silver particles to the total weight of the spherical silver particles and the flaky silver particles can be 0.3:1, or can be 0.7:1, or can be 0.5:1, etc. The percentage of the weight of the silver particles with three-dimensional dendritic microstructure in the total weight of the conductive particles is one selected from (0.05~0.95):1. The conductive paste contains silver particles with a three-dimensional dendritic microstructure and the ratio of the weight of the silver particles with a three-dimensional dendritic microstructure to the total weight of the conductive particles can be 0.05:1; or can also be 0.95:1; or can also be 0.7:1 etc. In addition, the specific surface area of the silver particles with a three-dimensional dendritic microstructure is limited within 0.2~3.5 m²/g, and the size of the spherical silver particles is varied in a range of 0.1~50.0 μm.

Optionally, the conductive particles are a mixture of spherical silver particles, flaky silver particles, and silver-coated copper particles with a three-dimensional dendritic microstructure, wherein the percentage of the flaky silver particles in the total mass of the spherical silver particles and the flaky silver particles is one selected from (0.3~0.7):1. The epoxy conductive paste of the present disclosure contains flaky silver particles and spherical silver particles, and the ratio of the weight of the flaky silver particles over the total weight of the spherical silver particles and the flaky silver particles can be 0.3:1, or can be 0.7:1, or can be 0.5:1, etc. The percentage of the weight of the silver-coated copper particles with three-dimensional dendritic microstructure in the total weight of the conductive particles is one selected from (0.05~0.95):1. The conductive paste contains silver-coated copper particles with a three-dimensional dendritic microstructure and the ratio of the weight of the silver-coated copper particles with a three-dimensional dendritic microstructure to the total weight of the conductive particles can be 0.05:1; or can also be 0.95:1; or can also be 0.7:1 etc. In addition, the specific surface area of the silver-coated copper particles with a three-dimensional dendritic microstructure is limited within 0.2~3.5 m²/g, and the size of the spherical silver particles is varied in a range of 0.1~50.0 μm.

In some embodiments, the particle size of the silver particles with a three-dimensional dendritic microstructure is varied in a range of 0.1~50 μm.

In some embodiments, the particle size of the silver-coated copper particles with a three-dimensional dendritic microstructure is varied in a range of 0.1~50 μm.

In some embodiments, a median particle size D50 of the conductive particles with a three-dimensional dendritic microstructure is selected from the range of 0.1 μm~50.0 μm to meet all different scenarios of the epoxy conductive paste according to some embodiments of the present disclosure. In a specific embodiment, the specific surface area of the conductive particles with a three-dimensional dendritic microstructure can be 0.2 m²/g. In another specific embodiment, the specific surface area of the conductive particles with a three-dimensional dendritic microstructure can be 3.5 m²/g. In yet another specific embodiment, the specific surface area of the conductive particles with a three-dimensional dendritic microstructure can be 2.0 m²/g, etc. This is because the specific surface area of the conductive particles may affect the conductivity of the conductive paste, so the specific surface area of the conductive particles with the three-dimensional dendritic microstructure of the present disclosure needs to be limited in the range of 0.2~3.5 m²/g.

Optionally, the weight ratio of the acrylic to the epoxy in the conductive paste according to some embodiments of the present disclosure is 0.2:30 to 2:20, which means that the weight ratio of the acrylic to the epoxy can be 0.2:30. Optionally, the weight ratio of the acrylic to the epoxy can be 2:20. Optionally, the weight ratio of the acrylic to the epoxy can also be 1:20 etc.

Optionally, the epoxy is at least one of bisphenol A-type epoxy, bisphenol F-type epoxy, naphthalene epoxy, polyurethane modified epoxy alicyclic epoxy, hydrogenated bisphenol A-type epoxy. That is to say, in the specific embodiment, the epoxy can be any one of the above-mentioned epoxy monomers, or it can be any two or a combination of two or more of the above-mentioned epoxy monomers.

The bisphenol A-type and bisphenol F-type epoxies used in the present disclosure are liquid epoxies with high purity and low chlorine content, with low viscosity and stable performance. The naphthalene type epoxy used in the present disclosure is an epoxy with a naphthalene ring structure. The introduction of the naphthalene ring structure can improve the heat resistance and dielectric properties of the epoxy, reduce water absorption, and make the epoxy to have high temperature and high humidity resistance. Among them, the typical structural formula of naphthalene epoxy is:

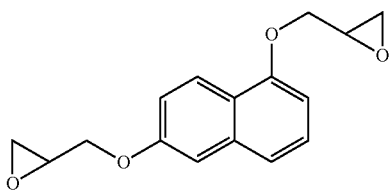

The polyurethane modified epoxy used in the present disclosure has good flexibility and can improve the shortcomings of ordinary epoxy after curing, such as high brittleness, poor mechanical impact resistance, poor moisture and heat resistance, low peel strength, poor low temperature resistance, etc. The polyurethane modified epoxy of the present disclosure is characterized by great toughness, strong strength, and good heat resistance.

Optionally, the acrylic is one or a mixture of urethane acrylate and aliphatic urethane acrylate. In specific embodiments, the acrylic can be selected from one or more of the acrylates listed above according to actual needs.

Optionally, the silane coupling agent is at least one of 2-(3,4-epoxycyclohexyl) ethanetrimethoxy silane, 3-glycidyl ether oxypropyl methyl dimethoxy silane, 3-glycidyl ether oxypropyl propyl trimethoxy silane, 3-glycidoxy propyl methyl diethoxy silane, 3-glycidoxy propyl triethoxy silane. In specific embodiments, the silane coupling agent can be selected from one or more of the silane coupling agents listed above according to actual needs, the purpose of which is to enhance the effect of adhesion.

In addition, the silane coupling agent used in the present disclosure can build a "molecular bridge" between the conductive paste and the interface between the semiconductor element that needs to be bonded, such as a chip, to connect two materials with very different properties, and increase the bonding strength.

Optionally, the reactive diluent is at least one of aliphatic glycidyl ether 1, 6 hexanediol diglycidyl ether, C12-C14 alkyl glycidyl ether, dipropylene glycol diglycidyl ether, nonylphenol glycidyl ether, o-cresol glycidyl ether, trimethylolpropane triglycidyl ether, castor oil triglycidyl ether, and pentaerythritol tetraglycidyl ether. In specific embodiments, the reactive diluent can be selected from one or more of the reactive diluents listed above according to actual needs.

Optionally, the toughening agent is at least one of the core-shell rubber epoxy toughening agent, polyester polyol, and fumed silica. In specific embodiments, the toughening agent can be selected from one or more of the above listed toughening agents according to actual needs.

Optionally, the cationic curing agent is at least one of a dicyandiamide type epoxy curing agent, a substituted urea accelerator, a fatty amine type epoxy curing agent, a polyamide type epoxy curing agent, an imidazole type epoxy curing agent, and a Lewis acid type epoxy curing agent. In specific embodiments, the curing agent can be selected from one or more of the curing agents listed above according to actual needs, and its purpose is to initiate the curing reaction.

In a specific embodiment, the conductive particles of the present disclosure may include one or more of silver particles having a three-dimensional dendritic microstructure, spherical silver particles, flaky silver particles, or spheroidal silver particles.

In a specific embodiment, the conductive particles of the present disclosure may include one or more of silver particles having a three-dimensional dendritic microstructure, spherical silver-coated copper particles, flaky silver-coated copper particles, or spheroidal silver-coated copper particles.

In a specific embodiment, the conductive particles of the present disclosure may include one or more of silver-coated copper particles having a three-dimensional dendritic microstructure, spherical silver-coated copper particles, flaky silver-coated copper particles, or spheroidal silver-coated copper particles.

In a specific embodiment, the conductive particles of the present disclosure may include one or more of silver-coated copper particles having a three-dimensional dendritic microstructure, spherical silver particles, flaky silver particles, or spheroidal silver particles.

In a specific embodiment, the conductive particles of the present disclosure may include one or more of silver-coated copper particles with a three-dimensional dendritic microstructure, silver particles with a three-dimensional dendritic microstructure, spherical silver-coated copper particles, flaky silver-coated copper particles, spheroidal silver-coated copper particles, spherical silver particles, flaky silver particles, or spheroidal silver particles.

In another aspect, the present disclosure provides a preparation method of epoxy conductive adhesive, the method includes the following steps:

Step 1. According to the total mass of 100 parts, weighing the following raw material components: 30~81 parts of conductive particles, 16~30 parts of epoxy, 0.2~3 parts of acrylic, 1~15 parts of reactive diluent, 1~15 parts of toughening agent, 0.4~5.0 parts of silane coupling agent, 0.4~5.0 parts of cationic curing agent;

Step 2. Mixing and stirring the epoxy, acrylic, reactive diluent, toughening agent, silane coupling agent, and cationic curing agent described in Step 1 and then adding the conductive particles, and continuing to stir until the mixture is uniform to get a mixture;

Step 3. Grinding the mixture to obtain epoxy conductive paste.

In yet another aspect, the present disclosure provides an application method of the above-mentioned epoxy conductive paste in semiconductor components for packaging a semiconductor device.

In a specific implementation, the application method includes first printing the epoxy conductive paste of the present disclosure on the substrate of a semiconductor element, and then placing the substrate printed with the epoxy conductive paste in an environment of 80° C. to 170° C. (for example, 150° C.). Next, the application method includes curing the printed epoxy conductive paste for 5 to 300 s (for example, 15 s) to obtain a semiconductor element containing the cured epoxy conductive paste of the present disclosure, which can be packaged into a semiconductor device including solar cell.

Compared with the prior art, the epoxy conductive paste provided according to some embodiments of the present disclosure provides many benefits and advantages. 1) As the epoxy conductive paste uses conductive particles with a three-dimensional dendritic microstructure, the contact between the two conductive particles is multiple point contacts, so the contact resistance is greatly reduced and the conductivity is improved, thereby reducing the amount of conductive particles used, reducing costs, and improving performance. 2) The epoxy acrylic conductive paste according to some embodiments of the present disclosure uses modified epoxy acrylic and silane coupling agent as adhesion promoters, so that the epoxy conductive paste of the present disclosure has improved quality in good conductivity, short curing time, and strong adhesion and can be used for a long-time operation at room temperature.

In addition, the preparation method of the epoxy conductive paste of the present disclosure is simple to operate and convenient for industrial production.

DETAILED DESCRIPTION OF THE INVENTION

To make the technical problem to be solved, the technical solution, and the beneficial effects of the present disclosure clearer, the present disclosure is further described in detail with reference to examples and accompanying drawings. It should be understood that the specific examples described herein are merely provided for illustrating, instead of limiting the present disclosure.

Figure 1:
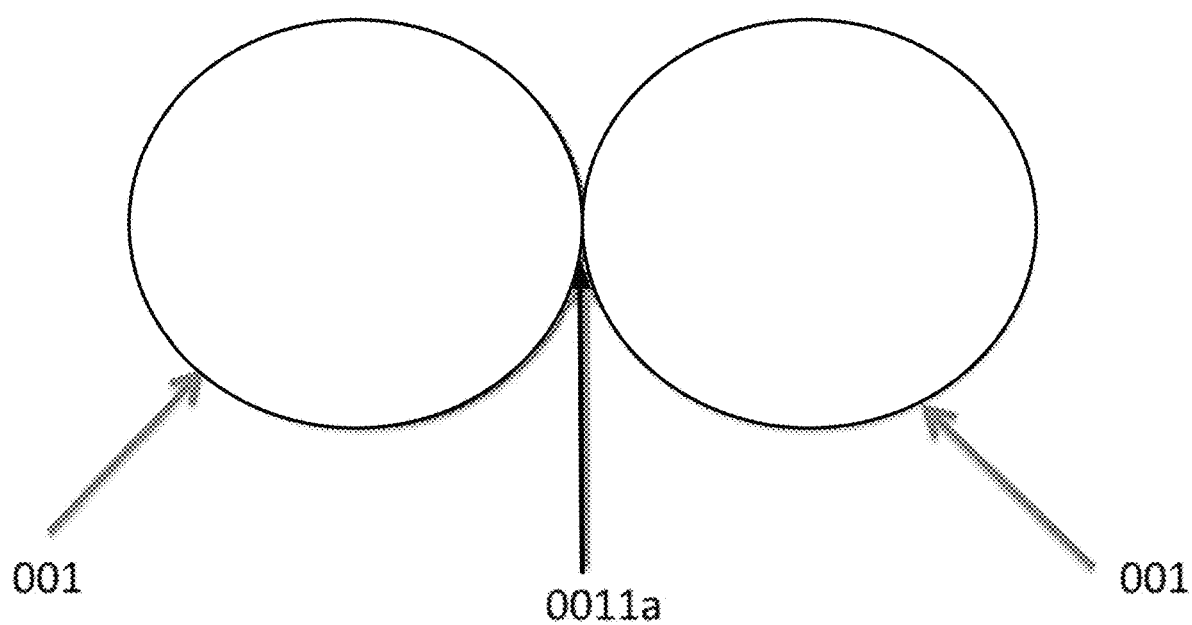
FIG. 1 is a schematic diagram of the contact between two spherical conductive particles in an existing conductive paste; wherein 001 represents the spherical conductive particle, and 0011a represents the contact point between the two spherical conductive particles.
Figure 2:
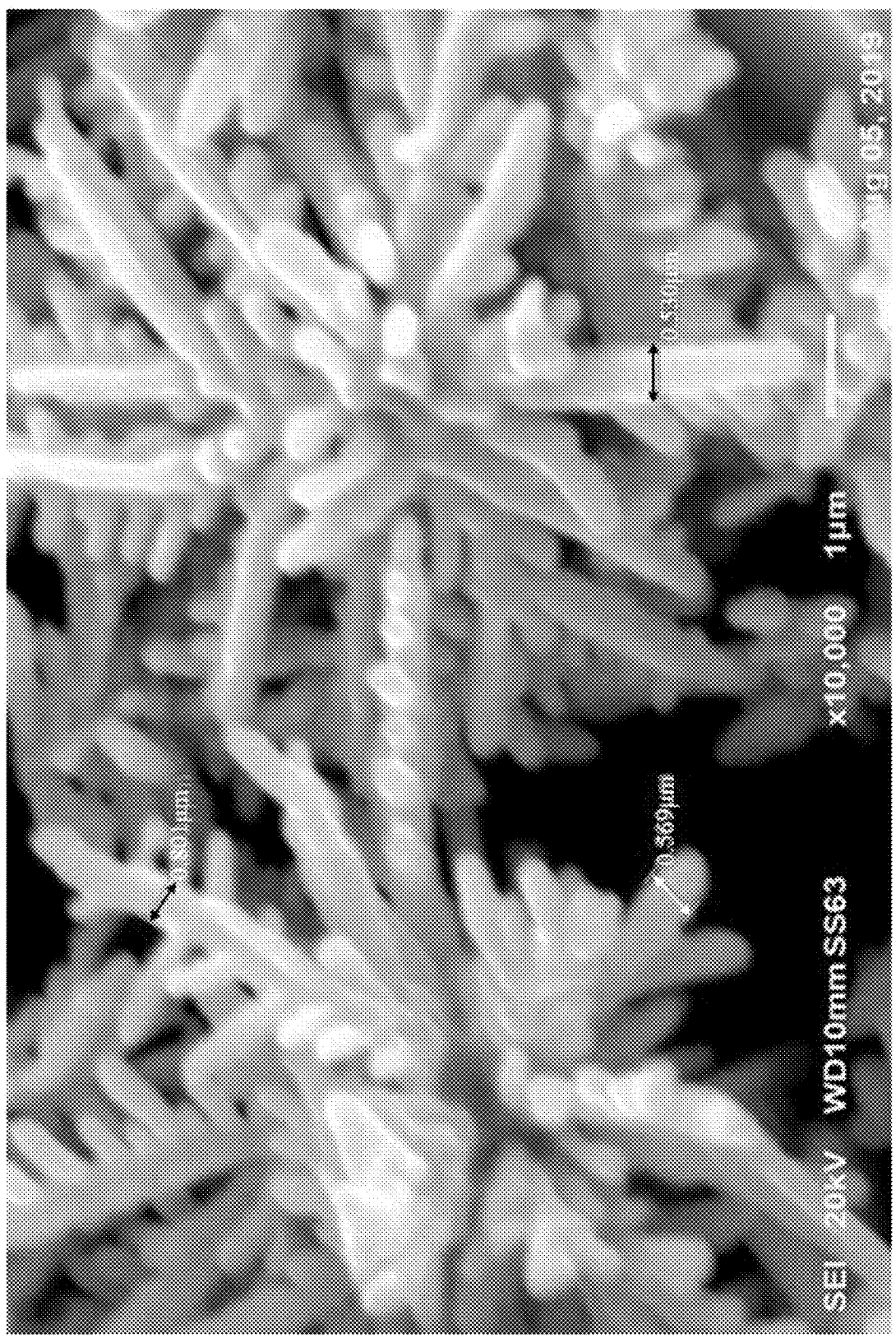
FIG. 2 is a scanning electron microscope (SEM) image of three-dimensional dendritic silver particles in an acrylic conductive paste provided in the present disclosure.
Figure 3:
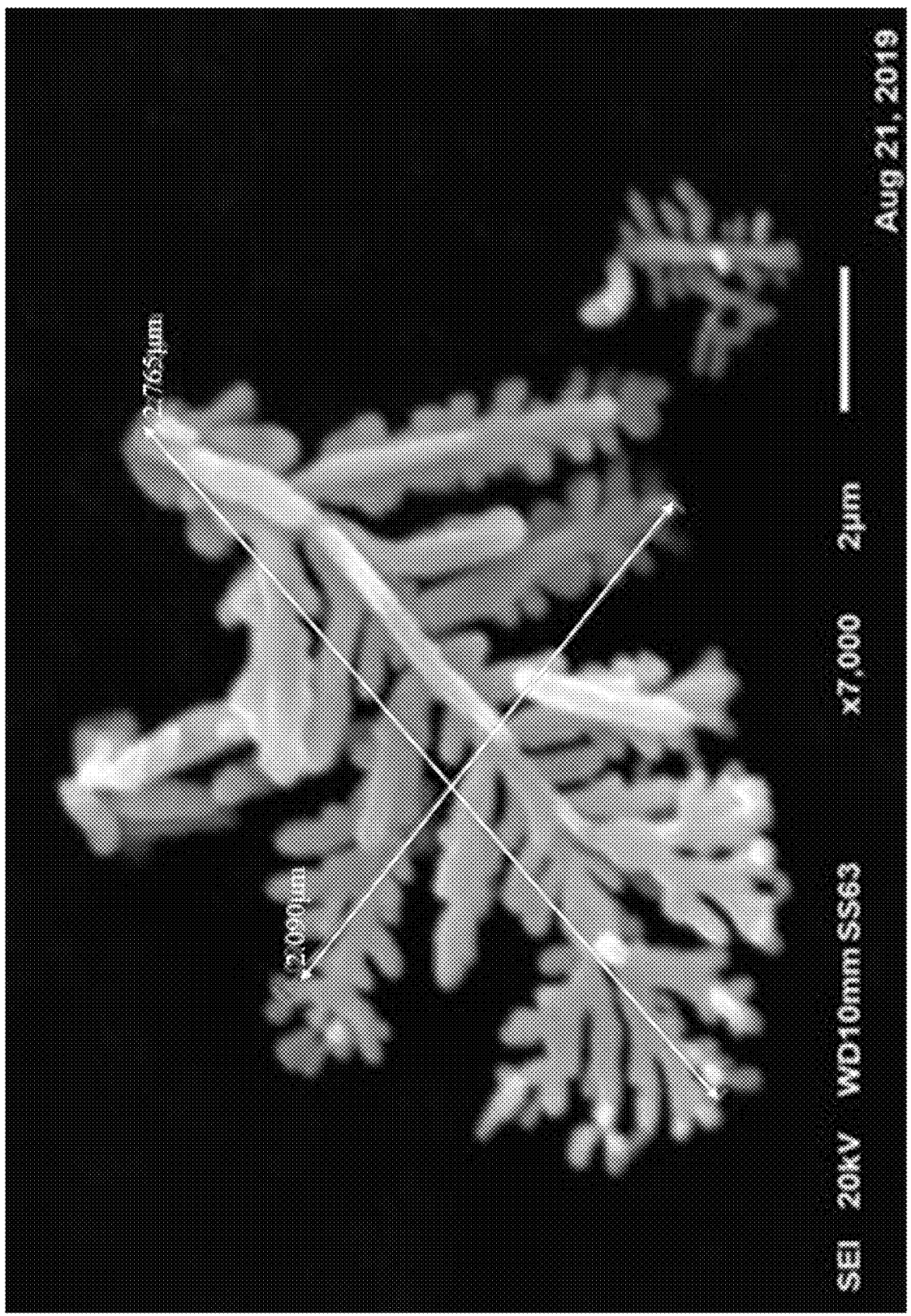
FIG. 3 is another SEM image of three-dimensional dendritic silver particles in an acrylic conductive paste provided in the present disclosure.

In an aspect, the present disclosure provides an improved epoxy conductive paste with increased electrical conductivity, short curing time, and strong adhesion for application with semiconductor components. In some embodiments, the acrylic conductive paste includes conductive particles with a three-dimensional dendritic microstructure to greatly improve contacts between the particles to enhance electrical conductivity yet without pushing up viscosity. In some embodiments, the three-dimensional dendritic silver particles, three-dimensional dendritic silver-coated copper particles, spherical silver particles, flaky silver particles, spherical silver particles, spherical silver-coated copper particles, and flaky silver-coated copper particles, and the spherical silver-coated copper particles used in the following examples are all obtained through purchase. Sample images of the three-dimensional dendritic silver particles obtained from the purchase were taken by scanning electron microscope (SEM) as shown in FIG. 2 and FIG. 3.

Embodiment 1

The epoxy conductive paste provided in this embodiment, based on a total weight of 100 parts, includes the following raw material components: 8 parts of spherical silver particles, 12 parts of flaky silver particles, 52 parts of silver particles with a three-dimensional dendritic microstructure, 7 parts of naphthalene epoxy, 3 parts of polyurethane modified epoxy, 8 parts of bisphenol F-type epoxy, 1.8 parts of polyurethane acrylate, 3.0 parts of o-cresol glycidyl ether, C12~C14 alkyl glycidol ether, 1.0 part of silane coupling agent, 1.2 parts of cationic curing agent (preferably, dicyandiamide and modified imidazole, 1.2 parts in total).

Through calculation, among the above components, the ratio of the weight of silver particles with three-dimensional dendritic microstructure to the total weight of conductive particles is 13:18.

Figure 4:
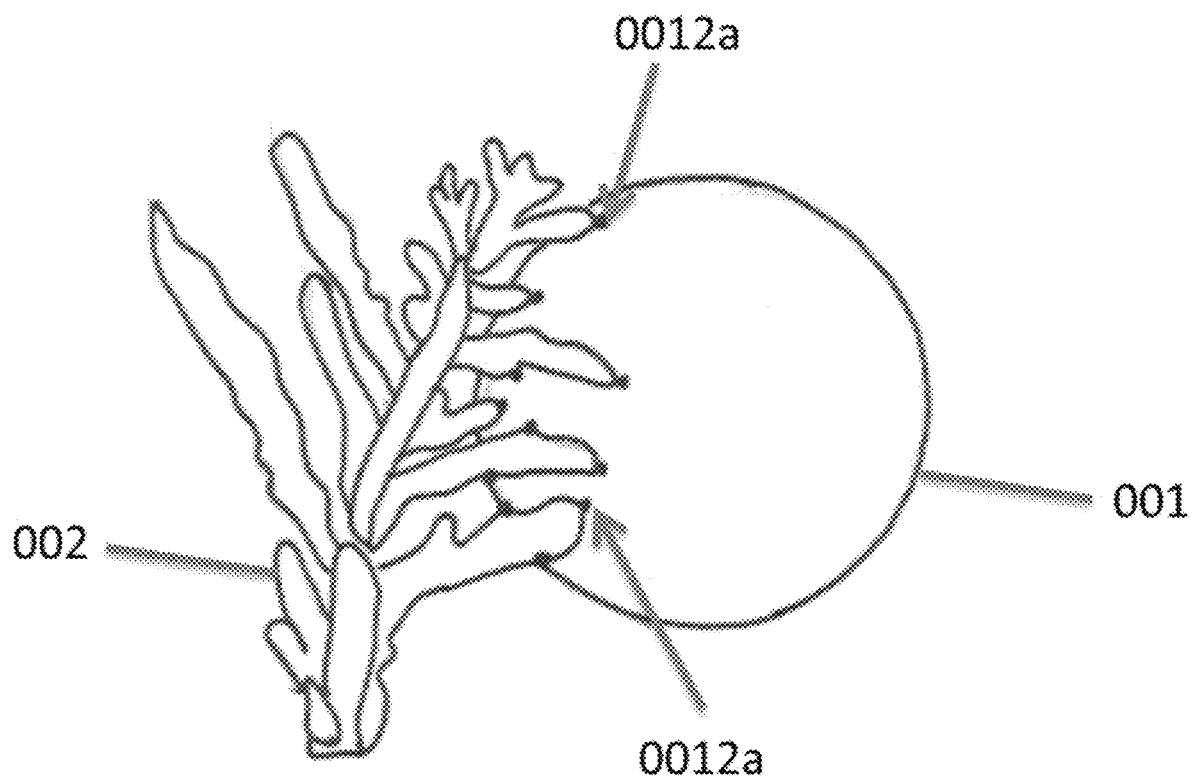
FIG. 4 is a schematic diagram of the contact between three-dimensional dendritic conductive particles and spherical conductive particles in an epoxy conductive paste provided in the present disclosure; among them, 002 represents three-dimensional dendritic conductive particles, 001 represents spherical conductive particles; 0012a is the contact point.

FIG. 4 shows the contact between silver particles with a three-dimensional dendritic microstructure and flaky silver particles or spherical silver particles belong to multi-point contact.

In addition, a median particle diameter D50 of the flaky silver particles in this embodiment is 1.5 μm, and the specific surface of the flaky silver particles is 0.36 m$^2$/g. The D50 of the spherical silver particles is 1.5 μm, and the specific surface of the spherical silver particles is 0.35 m$^2$/g. The D50 of the silver particles with three-dimensional microstructure is 4.0 μm, specific surface area of the silver particles with three-dimensional microstructure is 0.69 m$^2$/g.

The epoxy conductive paste provided in this embodiment is prepared by the following method, which includes the following steps:

S1. According to the total weight of 100 parts, weighing the following raw material components: 8 parts of spherical silver particles, 12 parts of flaky silver particles, 52 parts of silver particles with three-dimensional dendritic microstructure, 7 parts of naphthalene type epoxy, 3 parts of polyurethane modified epoxy, 8 parts of bisphenol F-type epoxy, 1.8 parts of polyurethane acrylate, 3.0 parts of o-cresol glycidyl ether, 3.0 parts of C12~C14 alkyl glycidyl ether, 1.0 part of silane coupling agent, 1.2 parts of cationic curing agent (preferably, dicyandiamide and modified imidazole, total 1.2 parts);

S2, potting naphthalene type epoxy, polyurethane modified epoxy, bisphenol F-type epoxy, polyurethane acrylate, o-cresol glycidyl ether, C12~C14 alkyl glycidyl ether, silane coupling agent and cationic curing agent to a stainless steel container; mixing and stirring evenly; then adding spherical silver particles, flaky silver particles and silver particles with three-dimensional dendritic microstructure, and continuing to stir until uniform to obtain a mixture;

S3. Grinding the mixture obtained in step S2 to obtain 200 g of acrylic conductive paste.

In order to verify the performance of the epoxy conductive paste obtained in the embodiment of the present disclosure, viscosity performance test, thermal expansion coefficient test, glass transition temperature test, curing temperature and time test, volume resistivity test, and shear strength test are carried out respectively.

Among them, the viscosity of the conductive paste is tested by using a viscometer at 25° C., the thermal expansion coefficient is tested by Thermomechanical Analysis (TMA) method; the glass transition temperature is tested by Differential Scanning calorimetry (DSC) method; the curing time, temperature and time are tested in a chain heating furnace.

The test method for the volume resistivity of the conductive paste is: printing the conductive adhesive sample on a glass sheet, and then curing it at a curing temperature of 150° C. and a curing time of 15 s; the cured conductive paste has a width of 5 mm, a height of 42 μm, and a length of 70 mm; then testing its resistance and calculating the volume resistivity of its conductive gel according to the following formula:

$$\rho = R \times \frac{b \times d}{L}$$

In the formula: L, b, d are the length, width and thickness (cm) of the conductive paste sample, R is the resistance of the conductive paste sample (Ω), and ρ is the volume resistivity of the conductive paste sample (Ω·cm).

Figure 6:
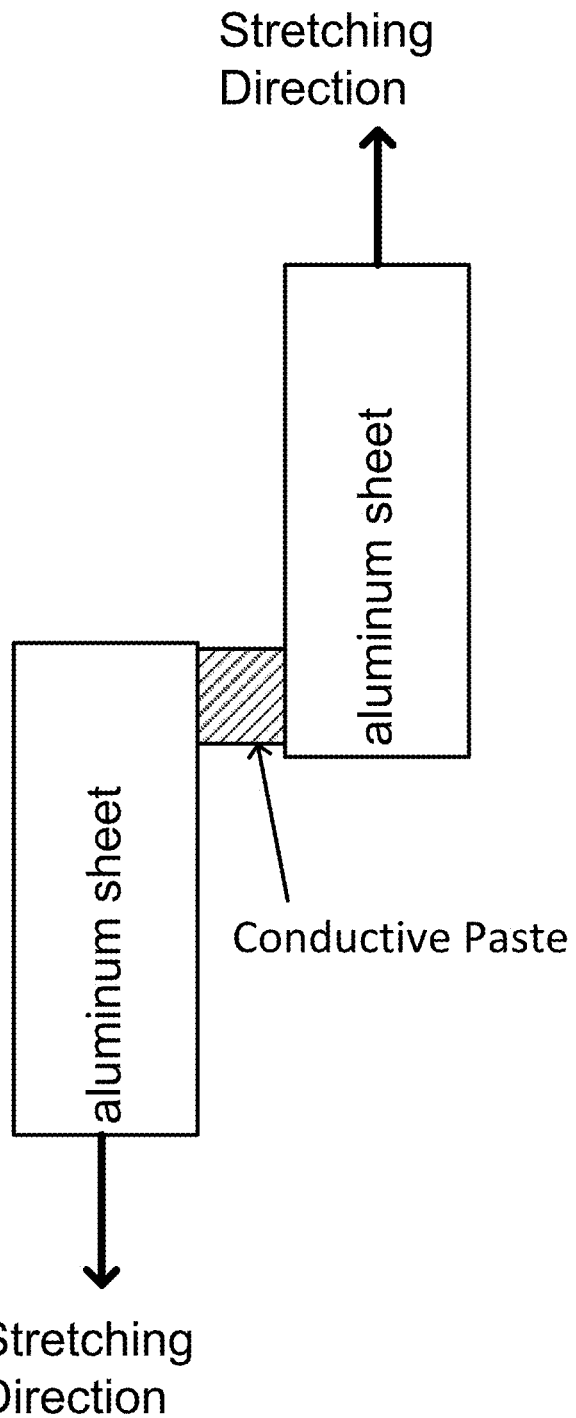
FIG. 6 is a schematic diagram of bond strength test configuration for the epoxy conductive paste provided in the present disclosure.

The shear strength test process of conductive paste is as follows: refer to the national standard GB/T 7124-2008 Determination of Tensile Shear Strength of Adhesive (Rigid Material vs. Rigid Material) method to measure the adhesive strength of the conductive paste sample. FIG. 6 is a schematic diagram of the shear strength test with two aluminum sheets attached with a conductive paste sample film. During the measurement, the tensile machine stretched two aluminum sheets at a speed of 200 mm/min in a direction of 180 degrees until the conductive paste film was broken. Write down the breaking load on the dial of the testing machine, take 6 tensile samples for testing, and press Formula to calculate the shear strength (W):

$$W=P/S$$

In the formula: W is the shear strength, P is the breaking load, S is the overlap area. In addition, there are 5 tensile samples in this test, and average value of the test results is recorded (see Table 2).

Figure 7:
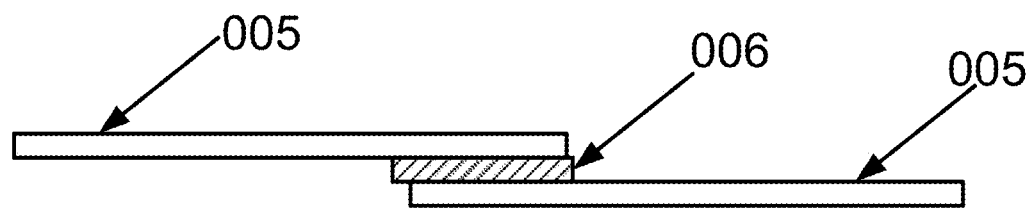
FIG. 7 is a schematic diagram of aluminum sheet bonding with the epoxy conductive paste provided in the present disclosure for a shear strength test; among them 005 represents the aluminum sheet, 006 represents the epoxy conductive paste.
Figure 8:
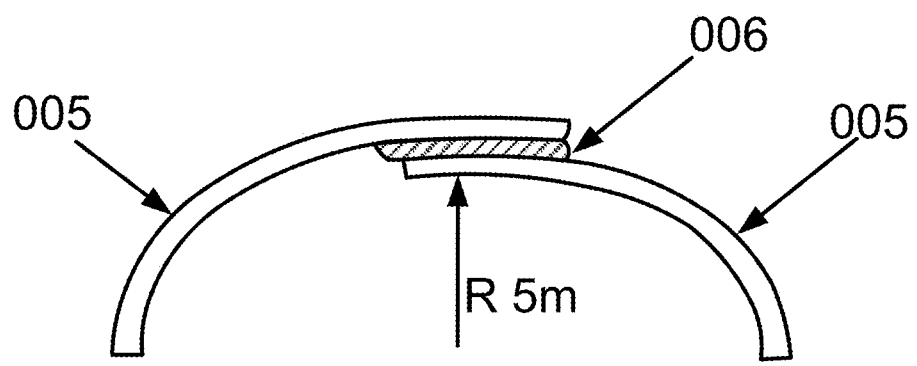
FIG. 8 is a schematic diagram of aluminum sheet bonding with a bending radius of 5 cm to the epoxy conductive paste provided in the present disclosure for the shear strength test; among them 005 represents the aluminum sheet, 006 represents the epoxy conductive paste.

A cracking test is done on whether there is a crack in the bonding area of the conductive paste, using the conductive paste to bond two aluminum sheets 005, as shown in FIG. 7. The size of the aluminum sheet 005 is 30×5×1 mm, and the size of the conductive paste 006 bonding part is 5×3 mm. After the conductive paste 006 is cured, the aluminum sheet 005 was bent as shown in FIG. 8 with a bending radius of 5 cm. Whether there is a crack in the conductive paste 006 bonding area is directly observed. The observation results are summarized in Table 2.

Figure 9:
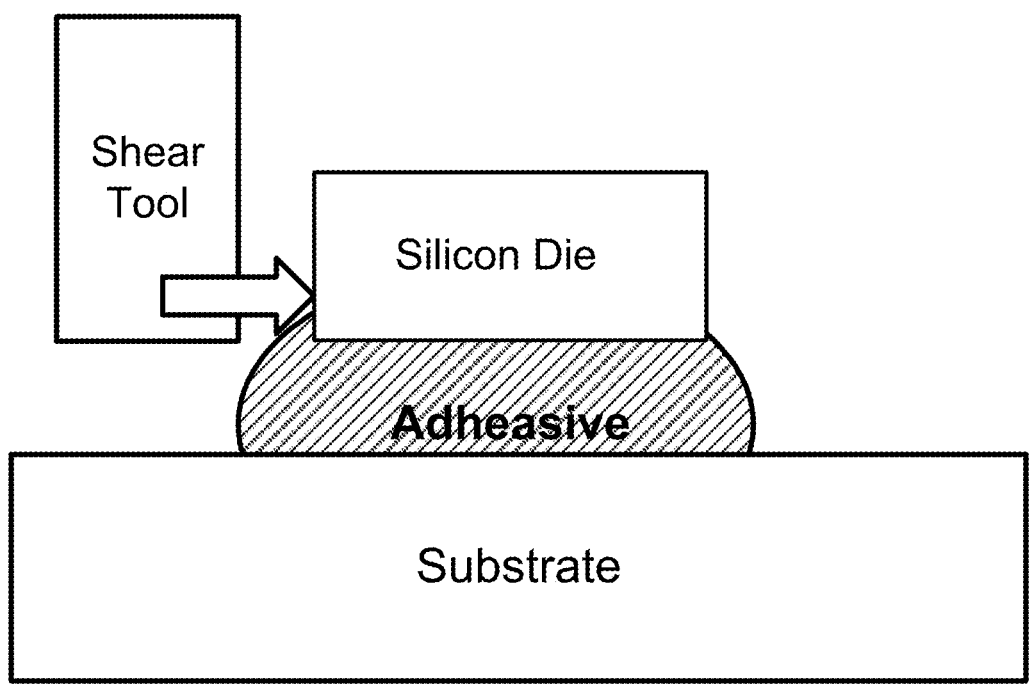
FIG. 9 is a schematic diagram of die shearing test for the epoxy conductive adhesive provided in the present disclosure.

FIG. 9 shows a schematic diagram of the die Shear Testing per Mil-Std-883 Method 2019. A dummy silicon die with x-y dimensions of 5×3 mm and height of 1 mm was used. A copper substrate with surface coating of NiPdAu was used. The epoxy conductive adhesive prepared from this example was printed on the substrate, then the dummy silicon die was attached on the epoxy conductive adhesive followed to curing at 150° C. for 30 min. The die shearing test was then performed and die shearing strength result is recorded (see Table 2).

Embodiment 2

The epoxy conductive paste provided in this embodiment, based on a total weight of 100 parts, includes the following raw material components: 8 parts of spherical silver particles, 12 parts of flaky silver particles, 52 parts of silver-coated copper particles with a three-dimensional dendritic microstructure, 7 parts of naphthalene epoxy, 3 parts of polyurethane modified epoxy, 8 parts of bisphenol F-type epoxy, 1.8 parts of urethane acrylate, 3.0 parts of o-cresol glycidyl ether, 3.0 parts of C12~C14 alkyl glycidyl ether, 1.0 part of silane coupling agent, 1.2 parts of cationic curing agent (preferably, dicyandiamide and modified imidazole, 1.2 parts in total).

By calculation, among the above components, the ratio of the weight of silver-coated copper particles with three-dimensional dendritic microstructure to the total weight of conductive particles is 13:18.

In addition, the D50 of the flaky silver particles in this embodiment is 1.5 μm, and the specific surface of the flaky silver particles is 0.36 m²/g. The D50 of the spherical silver particles is 1.5 μm, and the specific surface of the spherical silver particles is 0.35 m²/g. The D50 of silver-coated copper particles with three-dimensional dendritic microstructure is 6.5 μm, and the specific surface area of silver-coated copper particles with three-dimensional dendritic microstructure is 0.49 m²/g.

The preparation method of an epoxy conductive paste of this embodiment is the same as the preparation method of Embodiment 1.

The conductive paste according to the embodiment of the present disclosure is also tested for curing time, volume resistivity, glass-transition temperature, bonding strength, cracking. All test methods are the same as those of Embodiment 1. The results are also summarized in Table 2.

Embodiment 3

According to the total weight of 100 parts, a modified epoxy conductive paste provided in this embodiment includes the following raw material components: 72 parts of silver particles with a three-dimensional dendritic microstructure, 7 parts of naphthalene-type epoxy, 3 parts of polyurethane modified epoxy, 8 parts of bisphenol F-type epoxy, 1.8 parts of urethane acrylate, 3.0 parts of o-cresol glycidyl ether, 3.0 parts of C12~C14 alkyl glycidyl ether, 1.0 part of silane coupling agent, 1.2 parts of cationic curing agent (preferably, dicyandiamide and modified imidazole, 1.2 parts in total).

Among the components in the epoxy conductive paste, the D50 of the silver particles with three-dimensional dendritic microstructure is 4.0 µm, and the specific surface area of the silver particles with three-dimensional dendritic microstructure is 0.69 m²/g.

Figure 5:
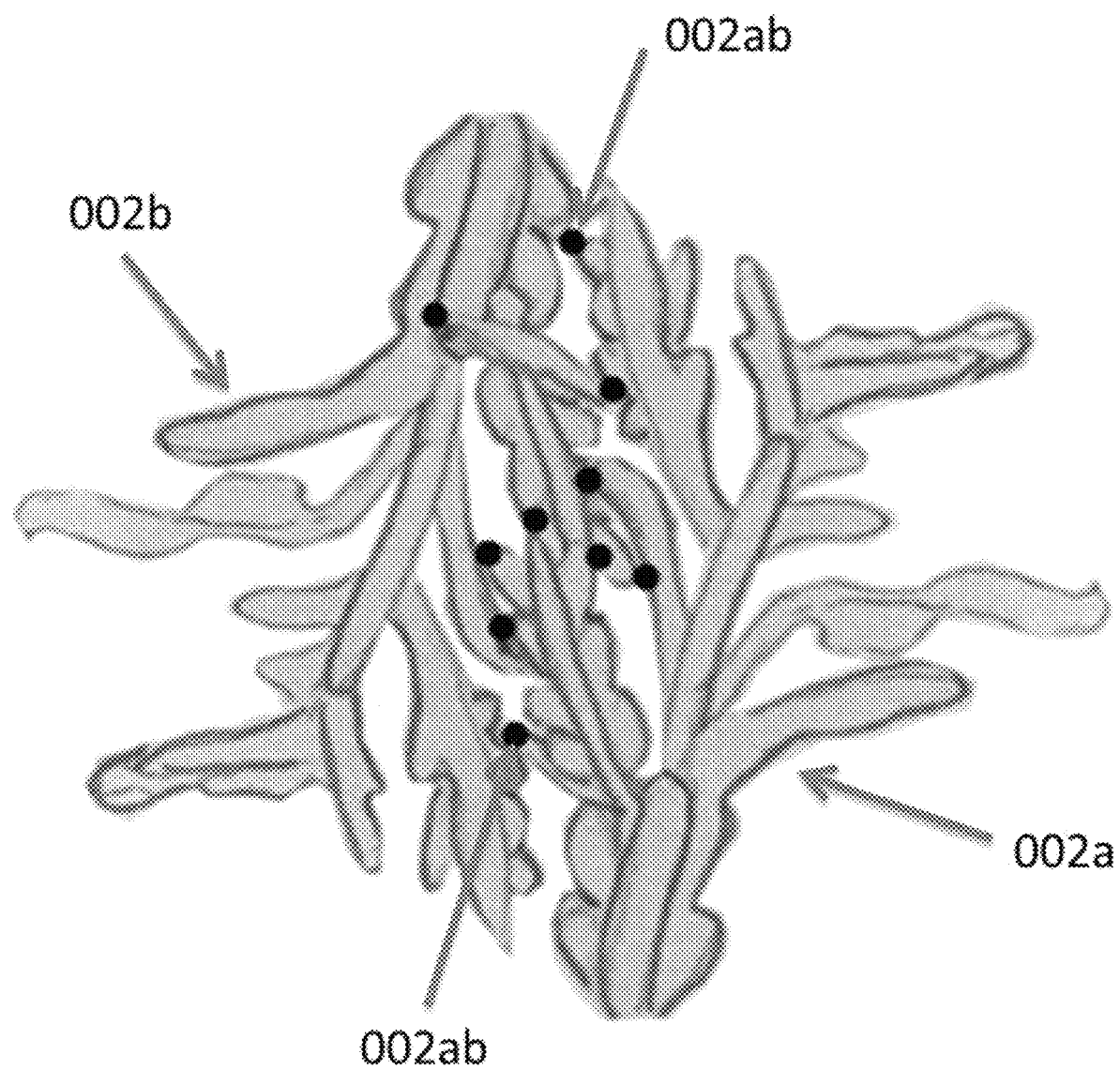
FIG. 5 is a schematic diagram of the contact between the three-dimensional dendritic conductive particles and the three-dimensional dendritic conductive particles in an epoxy conductive paste provided in the present disclosure; among them, 002a and 002b represent the three-dimensional dendritic conductive particles, and 002ab represents the contact point.

FIG. 5 shows that the contact between silver particles with three-dimensional dendritic microstructures belong to multi-point contact.

The preparation method of an epoxy conductive paste of this embodiment is the same as the preparation method of Embodiment 1.

The conductive paste according to the embodiment of the present disclosure is also tested for curing time, volume resistivity, glass-transition temperature, bonding strength, cracking. All test methods are the same as those of Embodiment 1. The results are also summarized in Table 2.

Embodiment 4

The epoxy conductive paste provided in this embodiment, based on a total weight of 100 parts, includes the following raw material components: 72 parts of three-dimensional dendritic silver-coated copper particles, 7 parts of naphthalene-type epoxy, 3 parts of polyurethane modified ring oxygen, 8 parts of bisphenol F-type epoxy, 1.8 parts of urethane acrylate, 3.0 parts of o-cresol glycidyl ether, 3.0 parts of C12~C14 alkyl glycidyl ether, 1.0 part of silane coupling agent, 1.2 parts of cationic curing agent (preferably, dicyandiamide and modified imidazole, 1.2 parts in total).

In the embodiment, the silver-coated copper particles with a three-dimensional dendritic microstructure have a D50 of 6.5 µm and a specific surface area of 0.49 m²/g.

The preparation method of the epoxy conductive paste of this embodiment is the same as the preparation method of Embodiment 1.

The conductive paste according to the embodiment of the present disclosure is also tested for curing time, volume resistivity, glass-transition temperature, bonding strength, cracking. All test methods are the same as those of Embodiment 1. The results are also summarized in Table 2.

Embodiment 5

The epoxy conductive adhesive provided in this embodiment, based on a total weight of 100 parts, includes the following raw material components: 62 parts of silver particles with a three-dimensional dendritic microstructure, 7 parts of naphthalene-type epoxy, 3 parts of polyurethane-modified epoxy, 18 parts of bisphenol F-type epoxy, 1.8 parts of urethane acrylate, 3.0 parts of o-cresol glycidyl ether, 3.0 parts of C12~C14 alkyl glycidyl ether, 1.0 part of silane coupling agent; 1.2 parts of cationic curing agent (preferably, dicyandiamide and modified imidazole, a total of 1.2 parts).

In the embodiment, the silver particles with a three-dimensional dendritic microstructure have a D50 of 4.0 µm and a specific surface area of 0.69 m²/g.

The preparation method of the epoxy conductive paste of this embodiment is the same as the preparation method of Embodiment 1.

The conductive paste according to the embodiment of the present disclosure is also tested for curing time, volume resistivity, glass-transition temperature, bonding strength, cracking. All test methods are the same as those of Embodiment 1. The results are also summarized in Table 2.

Embodiment 6

The epoxy conductive paste provided in this embodiment, based on a total weight of 100 parts, includes the following raw material components: 72 parts of silver particles with three-dimensional dendritic microstructure, 7 parts of naphthalene-type epoxy, 3 parts of polyurethane modified epoxy, 8 parts of bisphenol F-type epoxy, 1.8 parts of urethane acrylate, 3.0 parts of o-cresol glycidyl ether, 3.0 parts of C12~C14 alkyl glycidyl ether, 1.0 part of silane coupling agent, 1.2 parts of cationic curing agent.

In the embodiment, the D50 of the silver particles with three-dimensional dendritic microstructure is 4.0 µm, and the specific surface area of the silver particles with three-dimensional dendritic microstructure is 3.5 m²/g.

The preparation method of the epoxy conductive paste of this embodiment is the same as the preparation method of Embodiment 1.

The conductive paste according to the embodiment of the present disclosure is also tested for curing time, volume resistivity, glass-transition temperature, bonding strength, cracking. All test methods are the same as those of Embodiment 1. The results are also summarized in Table 2.

Comparative Example 1

An epoxy conductive paste provided by this comparative example, based on a total weight of 100 parts, includes the following raw material components: 72 parts of flaky silver particles; 7 parts of naphthalene-type epoxy; 3 parts of polyurethane modified epoxy; 9.8 parts of bisphenol F-type epoxy; 3.0 parts of o-cresol glycidyl ether; 3.0 parts of C12~C14 alkyl glycidyl ether, 1.0 part of silane coupling agent; 1.2 parts of cationic curing agent (preferably dicyandiamide and modified imidazole, 1.2 parts in total).

In the example, the D50 of the flaky silver particles is 1.5 µm; the specific surface area of the flaky silver particles is 0.36 m²/g.

The preparation method of an epoxy conductive paste of this comparative example is the same as the preparation method of Embodiment 1.

Comparative Example 2

The epoxy conductive paste provided by this comparative example, based on a total weight of 100 parts, includes the following raw material components: 72 parts of spherical silver particles, 7 parts of naphthalene type epoxy, 3 parts of polyurethane modified epoxy, 9.8 parts of bisphenol F-type epoxy, 3.0 parts of o-cresol glycidyl ether, 3.0 parts of C12~C14 alkyl glycidyl ether, 1.0 part of silane coupling agent, 1.2 parts of cationic curing agent (preferably dicyandiamide and modified Imidazole, 1.2 parts in total).

In the example, the D50 of the spherical silver particles is 1.5 µm, and the specific surface area of the spherical silver particles is 0.35 m²/g.

The preparation method of an epoxy conductive paste of this comparative example is the same as the preparation method of Embodiment 1.

Comparative Example 3

An epoxy conductive paste provided by this comparative example, based on a total weight of 100 parts, includes the following raw material components: 72 parts of silver particles with three-dimensional dendritic microstructure, 7 parts of naphthalene type epoxy, 3 parts of polyurethane modified epoxy, 9.8 parts of bisphenol F-type epoxy, 3.0 parts of o-cresol glycidyl ether, 3.0 parts of C12~C14 alkyl glycidyl ether, 1.0 part of silane coupling agent, 1.2 parts of cationic curing agent (preferably dicyandiamide and modified imidazole, a total of 1.2 parts).

In the example, the D50 of the silver particles with three-dimensional dendritic microstructure is 1.7 μm, and the specific surface area of the silver particles with three-dimensional dendritic microstructure is 4.19 m$^2$/g.

The preparation method of an epoxy conductive paste of this comparative example is the same as the preparation method of Embodiment 1.

Comparative Example 4

An epoxy conductive paste provided by this comparative example, based on a total weight of 100 parts, includes the following raw material components: 8 parts of spherical silver particles, 12 parts of flaky silver particles, 52 parts of silver particles with a three-dimensional dendritic microstructure, 7 parts of naphthalene epoxy, 3 parts of polyurethane modified epoxy, 9.8 parts of bisphenol F-type epoxy, 3.0 parts of o-cresol glycidyl ether, 3.0 parts of C12~C14 alkyl glycidyl ether, silane coupling 1.0 part of coupling agent and 1.2 parts of cationic curing agent (preferably dicyandiamide and modified imidazole, 1.2 parts in total).

By calculation, among the above components, the ratio of the weight of silver-coated copper particles with three-dimensional dendritic microstructure to the total weight of conductive particles is 13:18.

In addition, the flaky silver particles in this comparative example have a D50 of 1.5 μm and a specific surface area of 0.36 m$^2$/g; the spherical silver particles have a D50 of 1.5 μm and a specific surface area of 0.35 m$^2$/g; the silver-coated copper particles with a three-dimensional dendritic microstructure have a D50 of 4.0 μm and a specific surface area of 0.69 m$^2$/g.

The preparation method of an epoxy conductive paste of this comparative example is the same as the preparation method of Embodiment 1.

TABLE 1

The contents and parameters of each component of the epoxy conductive paste obtained in Embodiment 1 to Embodiment 6 and Comparative example 1 to Comparative example 4

| Embodiment Or Comparative Example | Conductive particles Spherical/Flaky | Conductive particles 3D dendritic | Modified epoxy acrylate | Silane coupling agent | Curing agent |
|---|---|---|---|---|---|
| Embodiment 1 | Spherical silver particles 8 parts D50 1.5 μm Specific surface area 0.35 m$^2$/g; Flaky silver particles 12 parts D50 1.5 μm Specific surface area 0.36 m$^2$/g | Dendritic silver particles 52 parts D50 4.0 μm Specific surface area 0.69 m$^2$/g | Naphthalene epoxy 7 parts Polyurethane modified epoxy 3 parts Bisphenol F-type epoxy 8 parts Urethane acrylate 1.8 parts | 1.0 part | Dicyandiamide and modified imidazole total 1.2 parts |
| Embodiment 2 | Spherical silver particles 8 parts D50 1.5 μm Specific surface area 0.35 m$^2$/g; Flaky silver particles 12 parts D50 1.5 μm Specific surface area 0.36 m$^2$/g | Dendritic silver-coated copper particles 52 parts D50 6.5 μm Specific surface area 0.49 m$^2$/g | Naphthalene epoxy 7 parts Polyurethane modified epoxy 3 parts Bisphenol F-type epoxy 8 parts Urethane acrylate 1.8 parts | 1.0 part | Dicyandiamide and modified imidazole total 1.2 parts |
| Embodiment 3 | None | Dendritic silver particles 72 parts D50 4.0 μm Specific surface area 0.69 m$^2$/g | Naphthalene epoxy 7 parts Polyurethane modified epoxy 3 parts Bisphenol F-type epoxy 8 parts Urethane acrylate 1.8 parts | 1.0 part | Dicyandiamide and modified imidazole total 1.2 parts |
| Embodiment 4 | None | Dendritic silver-coated copper particles 72 parts D50 6.5 μm Specific surface area 0.49 m$^2$/g | Naphthalene epoxy 7 parts Polyurethane modified epoxy 3 parts Bisphenol F-type epoxy | 1.0 part | Dicyandiamide and modified imidazole total 1.2 parts |

TABLE 1-continued

The contents and parameters of each component of the epoxy conductive paste obtained in Embodiment 1 to Embodiment 6 and Comparative example 1 to Comparative example 4

| Embodiment Or Comparative Example | Conductive particles Spherical/Flaky | Conductive particles 3D dendritic | Modified epoxy acrylate | Silane coupling agent | Curing agent |
|---|---|---|---|---|---|
| Embodiment 5 | None | Dendritic silver particles 62 parts D50 4.0 μm Specific surface area 0.69 m$^2$/g | Naphthalene epoxy 7 parts Polyurethane modified epoxy 3 parts Bisphenol F-type epoxy 18 parts Urethane acrylate 1.8 parts | 1.0 part | Dicyandiamide and modified imidazole total 1.2 parts |
| Embodiment 6 | None | Dendritic silver particles 72 parts D50 4.0 μm Specific surface area 3.5 m$^2$/g | Naphthalene epoxy 7 parts Polyurethane modified epoxy 3 parts Bisphenol F-type epoxy 8 parts Urethane acrylate 1.8 parts | 1.0 part | Dicyandiamide and modified imidazole total 1.2 parts |
| Comparative Example 1 | Flaky silver particles 72 parts D50 1.5 μm Specific surface area 0.36 m$^2$/g | None | Naphthalene epoxy 7 parts Polyurethane modified epoxy 3 parts Bisphenol F-type epoxy 9.8 parts | 1.0 part | Dicyandiamide and modified imidazole total 1.2 parts |
| Comparative Example 2 | Spherical silver particles 72 parts D50 1.5 μm Specific surface area 0.35 m$^2$/g | None | Naphthalene epoxy 7 parts Polyurethane modified epoxy 3 parts Bisphenol F-type epoxy 9.8 parts | 1.0 part | Dicyandiamide and modified imidazole total 1.2 parts |
| Comparative Example 3 | None | Dendritic silver particles 72 parts D50 1.7 μm Specific surface area 4.19 m$^2$/g | Naphthalene epoxy 7 parts Polyurethane modified epoxy 3 parts Bisphenol F-type epoxy 9.8 parts | 1.0 part | Dicyandiamide and modified imidazole total 1.2 parts |
| Comparative Example 4 | Spherical silver particles 8 parts D50 1.5 μm Specific surface area 0.35 m$^2$/g; Flaky silver particles 12 parts D50 1.5 μm Specific surface area 0.36 m$^2$/g | Dendritic silver particles 72 parts D50 4.0 μm Specific surface area 0.69 m$^2$/g | Naphthalene epoxy 7 parts Polyurethane modified epoxy 3 parts Bisphenol F-type epoxy 9.8 parts | 1.0 part | Dicyandiamide and modified imidazole total 1.2 parts |

It can be seen from Table 1, comparing Embodiment 1 with Embodiment 2, the difference is that Embodiment 1 uses a mixture of flaky silver particles, spherical silver particles, and silver particles with a three-dimensional dendritic microstructure; Embodiment 2 uses a mixture of flaky silver particles, spherical silver particles, and silver-coated copper particles with three-dimensional dendritic microstructure.

The difference between Embodiment 5 and Embodiment 3 is that the content of silver particles with a three-dimensional dendritic microstructure used in Embodiment 5 is 10% lower than that of Embodiment 3. The organic components used in Embodiment 5 are the same as that of Embodiment 3.

Compared with Embodiment 1, the difference of Comparative Example 1 and Comparative Example 2 is that Comparative Example 1 and Comparative Example 2 do not contain conductive particles with a three-dimensional dendritic microstructure and separately contain flaky silver particles or spherical silver particles. Embodiment 1 contains both spherical and flaky conductive particles, as well as conductive particles with a three-dimensional dendritic microstructure.

In Comparative Example 3, compared with Embodiment 3, the difference is that the specific surface area of the conductive particles with three-dimensional dendritic microstructure is different. The specific surface area of the conductive particles with three-dimensional dendritic microstructure in the conductive paste of Embodiment 3 is 0.69 m$^2$/g, which is between 0.2 and 3.5 m$^2$/g. However, the specific surface area of the conductive particles with three-dimensional dendritic microstructure in the conductive paste in Comparative Example 3 is as high as 4.19 m$^2$/g.

Compared with Embodiment 1, Comparative Example 4 only contains epoxy, while Embodiment 1 contains epoxy and acrylic and the weight ratio of the two is 10:1 which is between 0.2:30 and 2:20.

In order to verify the performance of the epoxy conductive pastes obtained in the embodiments of the present disclosure, the epoxy conductive pastes obtained in Embodiments 1-6 and Comparative Examples 1-4 are tested for viscosity performance, thermal expansion coefficient, and glass transition temperature, curing temperature and time, volume resistivity and shear strength. All methods of the tests mentioned above are the same as those described in Embodiment 1. The specific results of the conductive pastes in Embodiments 1-6 and Comparative Examples 1-4 in all tests mentioned above are shown in Table 2 below.

TABLE 2

The performance data table of the conductive adhesive samples of Embodiments 1 to 6 (represented by 1 to 6), and Comparative Examples 1 to 4 (represented by 1' to 4')

| Test Item | Example | | | | | | | | | |
|---|---|---|---|---|---|---|---|---|---|---|
| | 1 | 2 | 3 | 4 | 5 | 6 | 1" | 2" | 3" | 4" |
| Silver content (wt %) | 72 | 72 | 72 | 72 | 62 | 72 | 72 | 72 | 72 | 72 |
| Volume resistivity (Ω · cm) | $2.0 \times 10^{-4}$ | $2.2 \times 10^{-4}$ | $1.2 \times 10^{-4}$ | $1.3 \times 10^{-4}$ | $1.4 \times 10^{-4}$ | $1.3 \times 10^{-4}$ | $12 \times 10^{-4}$ | $14 \times 10^{-4}$ | $16 \times 10^{-4}$ | $2.0 \times 10^{-4}$ |
| Shear strength (MPa) | 13.5 | 13.1 | 13.9 | 13.5 | 13.7 | 13.7 | 13.9 | 13.7 | 13.8 | 13.6 |
| Printing performance | good | good | fair | fair | fair | fair | good | good | poor | good |
| Checking at bonding region of the conductive paste with | no cracking | no cracking | no cracking | no cracking | no cracking | no cracking | no cracking | no cracking | no cracking | cracking |
| Thermal expansion coefficient (ppm) | 125 ± 10 | 125 ± 11 | 125 ± 12 | 125 ± 13 | 125 ± 14 | 125 ± 15 | 125 ± 16 | 125 ± 17 | 125 ± 18 | 125 ± 10 |
| Glass transition temperature (° C.) | 125 ± 10 | 125 ± 10 | 125 ± 10 | 125 ± 10 | 125 ± 10 | 125 ± 10 | 125 ± 10 | 125 ± 10 | 125 ± 10 | 125 ± 10 |
| Viscosity@25 (° C.) | 26000 | 27000 | 31000 | 32000 | 27000 | 36000 | 25000 | 26000 | 45000 | 26000 |
| Curing time @150° C. (min) | 15 | 15 | 15 | 15 | 15 | 15 | 15 | 15 | 15 | 15 |
| Die shear strength (kg) | 37 | 35 | 34 | 35 | 33 | 32 | 35 | 32 | 32 | 33 |

It can be seen from the data in Table 2: The thermal expansion coefficients and glass transition temperatures of Examples 1 to 6 (i.e., 1 to 6) and Comparative Examples 1 to 4 (i.e., 1' to 4') are almost the same.

Comparing Embodiment 1 with Embodiment 2, it can be seen that silver particles or silver-coated copper particles with a three-dimensional dendritic microstructure can form contact between adjacent conductive particles with multiple points to establish network-like electrical conduction and characteristics of low volume resistivity and good electrical conductivity. However, particles with unique three-dimensional dendritic microstructure makes its printing ink permeability performance inferior to that of spherical silver particles or flaky silver particles. On the other hand, spherical silver particles or flaky silver particles have the advantage of good printing ink permeability, but its electrical conductivity is worse than silver particles with a three-dimensional dendritic microstructure or silver-coated copper particles with a three-dimensional dendritic microstructure. By mixing spherical silver particles or flaky silver particles with silver particles or silver-coated copper particles with three-dimensional dendritic microstructure, it not only maintains the advantages of the high conductivity associated with three-dimensional dendritic microstructure, but also overcomes shortcomings of poor printing ink permeability performance. Thus, the conductive paste has the characteristics of good conductivity and excellent printing performance.

Comparing Embodiment 5 with Embodiment 3, because of the decrease in the content of silver particles with three-dimensional dendritic microstructure in Embodiment 5, the resistivity is slightly higher than that of Embodiment 3, but still significantly lower than that of Comparative Examples 1-3. This reflects the reason why silver particles with a three-dimensional dendritic microstructure have good electrical conductivity. Comparing Comparative Example 1 and Comparative Example 2 with Embodiment 1, the conductive pastes of Comparative Example 1, Comparative Example 2 and Embodiment 1 all have good printability, indicating that even the conductive particles in the conductive paste of Embodiment 1 does not contain conductive particles with a three-dimensional dendritic microstructure, the conductive pastes can be still produced with better printability. However, the volume resistivity of Comparative Example 1 and Comparative Example 2 is significantly higher than that of Embodiment 1 to Embodiment 6, indicating that the conductivity of Comparative Example 1 and Comparative Example 2 is poor. That is, if the conductive particles in the conductive paste only contain spherical conductive particles or flaky conductive particles, the volume resistivity of the conductive paste will increase and the conductivity will deteriorate. This also reflects that when the total weight of the conductive particles used is the same, the use of three-dimensional dendritic conductive particles can reduce the volume resistivity of the conductive paste and improve its electrical conductivity.

Comparing Comparative Example 3 with Embodiment 3, because of the increase in the specific surface area of the conductive particles with three-dimensional dendritic microstructure, the volume resistivity of Comparative Example 3 is significantly higher than that of Embodiment 3, and the viscosity is also higher. The significantly higher viscosity than that of Embodiment 3 in the Comparative Example 3 causes its printing difficulties. Therefore, in order to ensure good conductivity and printability of the conductive paste, the specific surface area of the conductive particles with three-dimensional dendritic microstructures needs to be limited in a range between 0.2 and 3.5 m$^2$/g.

Comparing Comparative Example 4 with Embodiment 1, it can be seen that in Embodiment 1, by using the epoxy and acrylic in a weight ratio of 10:1, the prepared conductive paste does not crack in the bending test. Conductive paste of Comparative Example 4 is cracked in the bending test. It shows that the flexibility of the conductive paste of Embodiment 1 has better shear strength than that of the conductive paste of Comparative Example 4. That is, if the conductive paste contains only epoxy, the flexibility of the conductive paste will be poor. This also reflects that when the weight of the conductive particles used is the same, adding acrylic can improve the flexibility of the conductive paste.

Although a limited number of embodiments are shown above, much more sample products based on various raw material combinations are produced with similar tests being done, which are combined to identify some embodiments presented in this disclosure. In particular, an epoxy conductive paste is provided, based on 100 parts by total mass, including the following raw materials: 30~81 parts of conductive particles, 16~30 parts of epoxy, 0.2~3 parts of acrylic, 1~15 parts of reactive diluent, 1~15 parts of toughening agent, 0.4~5 parts of silane coupling agent, 0.4~5 parts of cationic curing agent. Herein, the conductive particles in the epoxy conductive paste include particles with a three-dimensional dendritic microstructure. Optionally, among the conductive particles, at least 5% of them are characterized by a three-dimensional dendritic microstructure. Optionally, the conductive particles with the three-dimensional dendritic microstructure is characterized by a specific surface area limited in a range of 0.2~3.5 m$^2$/g.

Optionally, for forming the epoxy conductive paste of the present disclosure, based on 100 parts by total mass, 30~33 parts of conductive particles containing some of particles with the three-dimensional dendritic microstructure are selected to be used for producing the epoxy conductive paste. Optionally, 33~37 parts of conductive particles containing some of particles with the three-dimensional dendritic microstructure are used. Optionally, 37~42 parts of conductive particles containing some of particles with the three-dimensional dendritic microstructure are used. Optionally, 42~47 parts of conductive particles containing some of particles with the three-dimensional dendritic microstructure are used. Optionally, 47~53 parts of conductive particles containing some of particles with the three-dimensional dendritic microstructure are used. Optionally, 53~59 parts of conductive particles containing some of particles with the three-dimensional dendritic microstructure are used. Optionally, 59~65 parts of conductive particles containing some of particles with the three-dimensional dendritic microstructure are used. Optionally, 65~70 parts of conductive particles containing some of particles with the three-dimensional dendritic microstructure are used. Optionally, 70~74 parts of conductive particles containing some of particles with the three-dimensional dendritic microstructure are used. Optionally, 74~77 parts of conductive particles containing some of particles with the three-dimensional dendritic microstructure are used. Optionally, 77~79 parts of conductive particles containing some of particles with the three-dimensional dendritic microstructure are used. Optionally, 79~81 parts of conductive particles containing some of particles with the three-dimensional dendritic microstructure are used. Optionally, 16~18 parts of epoxy are used. Optionally, 18~21 parts of epoxy are used. Optionally, 21~24 parts of epoxy are used. Optionally, 24~27 parts of epoxy are used. Optionally, 27~30 parts of epoxy are used. Optionally, 0.2~0.4 parts of acrylic are used. Optionally, 0.4~0.8 parts of acrylic are used. Optionally, 0.8~1.5 parts of acrylic are used. Optionally, 1.5~2 parts of acrylic are used. Optionally, 2~2.4 parts of acrylic are used. Optionally, 2.4~2.8 parts of acrylic are used. Optionally, 2.8~3 parts of acrylic are used. Optionally, 1~3 parts of reactive diluent are used. Optionally, 3~5 parts of reactive diluent are used. Optionally, 5~8 parts of reactive diluent are used. Optionally, 8~11 parts of reactive diluent are used. Optionally, 11~13 parts of reactive diluent are used. Optionally, 13~15 parts of reactive diluent are used. Optionally, 1~3 parts of toughening agent are used. Optionally, 3~5 parts of toughening agent are used. Optionally, 5~8 parts of toughening agent are used. Optionally, 8~11 parts of toughening agent are used. Optionally, 11~13 parts of toughening agent are used. Optionally, 13~15 parts of toughening agent are used. Optionally, 0.4~0.8 parts of silane coupling agent are used. Optionally, 0.8~1.5 parts of silane coupling agent are used. Optionally, 1.5~2 parts of silane coupling agent are used. Optionally, 2~2.4 parts of silane coupling agent are used. Optionally, 2.4~2.8 parts of silane coupling agent are used. Optionally, 2.8~3.2 parts of silane coupling agent are used. Optionally, 3.2~3.6 parts of silane coupling agent are used. Optionally, 3.6~4.2 parts of silane coupling agent are used. Optionally, 4.2~4.6 parts of silane coupling agent are used. Optionally, 4.6~5 parts of silane coupling agent are used. Optionally, 0.4~0.8 parts of cationic curing agent are used. Optionally, 0.8~1.5 parts of cationic curing agent are used. Optionally, 1.5~2 parts of cationic curing agent are used. Optionally, 2~2.4 parts of cationic curing agent are used. Optionally, 2.4~2.8 parts of cationic curing agent are used. Optionally, 2.8~3.2 parts of cationic curing agent are used. Optionally, 3.2~3.6 parts of cationic curing agent are used. Optionally, 3.6~4.2 parts of cationic curing agent are used. Optionally, 4.2~4.6 parts of cationic curing agent are used. Optionally, 4.6~5 parts of cationic curing agent are used.

Optionally, the conductive particles with a three-dimensional dendritic microstructure in the epoxy conductive paste is characterized by a specific surface area limited in a range of 0.2~3.5 m$^2$/g.

Optionally, the conductive particles with a three-dimensional dendritic microstructure are silver particles with a three-dimensional dendritic microstructure or silver-coated copper particles with a three-dimensional dendritic microstructure.

In addition, if a conductive paste contains conductive particles only with three-dimensional dendritic, the viscosity of the conductive paste may increase, and even the printability of the conductive paste may be affected. Therefore, in order to reduce the viscosity of the epoxy conductive paste to maintain printability on the basis of ensuring that the conductivity of the conductive paste does not change significantly, the conductive particles in the epoxy conductive paste of the present disclosure also include at least 5% of one or a combination of more of spherical conductive particles, flaky conductive particles, or spheroidal conductive particles.

Optionally, the conductive particles are a mixture of spherical silver particles and silver particles with a three-dimensional dendritic microstructure. In the embodiment, a ratio of the weight of the silver particles with a three-dimensional dendritic microstructure to the total weight of the conductive particles is one selected from (0.05~0.95):1. That is, the epoxy conductive paste of the present disclosure contains silver particles with a three-dimensional dendritic microstructure with a mass ratio to the total conductive particles being 0.05:1; or 0.95:1; or any one in between such as 0.7:1, etc. In addition, the silver particles with three-dimensional dendritic microstructure are characterized by a specific surface area limited in a range of 0.2~ 3.5 m$^2$/g, and the spherical silver particles are characterized by particle sizes varied in a range of 0.1 μm~50.0 μm.

Optionally, the conductive particles are a mixture of spherical silver particles and silver-coated copper particles with a three-dimensional dendritic microstructure. In the embodiment, the mass ratio of the silver-coated copper particles with a three-dimensional dendritic microstructure in the conductive particles is one selected from (0.05~0.95):1. In the embodiment, the epoxy conductive paste of the present disclosure contains silver-coated copper particles with a three-dimensional dendritic microstructure with a mass ratio to the total conductive particles being 0.05:1; or 0.95:1; or any one in between such as 0.7:1, etc. In addition, the silver particles with three-dimensional dendritic microstructure are characterized by a specific surface area limited in a range of 0.2~3.5 m$^2$/g, and the spherical silver particles are characterized by particle sizes varied in a range of 0.1 μm~50.0 μm.

Optionally, the conductive particles are a mixture of flaky silver particles and silver particles with a three-dimensional dendritic microstructure. In the embodiment, the mass ratio of the silver particles with a three-dimensional dendritic microstructure to the total conductive particles is one selected from (0.05~0.95):1. In the embodiment, the epoxy conductive paste of the present disclosure contains silver particles with a three-dimensional dendritic microstructure with a mass ratio in the total conductive particles being 0.05:1; or 0.95:1; or any one in between such as 0.7:1, etc. In addition, the silver particles with three-dimensional dendritic microstructure are characterized by a specific surface area limited in a range of 0.2~3.5 m$^2$/g, and the flaky silver particles are characterized by particle sizes varied in a range of 0.1 μm~50.0 μm.

Optionally, the conductive particles are a mixture of flaky silver particles and silver-coated copper particles with a three-dimensional dendritic microstructure. In the embodiment, the mass ratio of the silver-coated copper particles with a three-dimensional dendritic microstructure in the total conductive particles is one selected from (0.05~0.95):1. In the embodiment, the epoxy conductive paste of the present disclosure contains silver-coated copper particles with a three-dimensional dendritic microstructure with a mass ratio in the total conductive particles being 0.05:1; or 0.95:1; or any one in between such as 0.7:1, etc. In addition, the silver-coated copper particles with three-dimensional dendritic microstructure are characterized by a specific surface area limited in a range of 0.2~3.5 m$^2$/g, and the size of the flaky silver particles are characterized by particle sizes varied in a range of 0.1 μm~50.0 μm.

Optionally, the conductive particles are a mixture of flaky silver-coated copper particles and silver-coated copper particles with a three-dimensional dendritic microstructure. In the embodiment, the mass ratio of the silver-coated copper particles with a three-dimensional dendritic microstructure in the conductive particles is one selected from (0.05~0.95):1. In the embodiment, the epoxy conductive paste of the present disclosure contains silver-coated copper particles with a three-dimensional dendritic microstructure with a mass ratio in the conductive particles being 0.05:1; or 0.95:1; or any one in between such as 0.7:1, etc. In addition, the silver-coated copper particles with three-dimensional dendritic microstructure are characterized by a specific surface area limited in a range of 0.2~3.5 m$^2$/g, and the flaky silver-coated copper particles are characterized by particle sizes varied in a range of 0.1 μm~50.0 μm.

Optionally, the conductive particles are a mixture of spherical silver particles, flaky silver particles, and silver particles with a three-dimensional dendritic microstructure, wherein a ratio of a mass the flaky silver particles to the total mass of the spherical silver particles and the flaky silver particles is one selected from (0.3~0.7):1. The epoxy conductive paste of the present disclosure contains flaky silver particles and spherical silver particles, and the ratio of the weight of the flaky silver particles to the total weight of the spherical silver particles and the flaky silver particles can be 0.3:1, or can be 0.7:1, or can be any one in between such as 0.5:1, etc. The ratio of the weight of the silver particles with three-dimensional dendritic microstructure to the total weight of the conductive particles is one selected from (0.05~0.95):1. The epoxy conductive paste contains silver particles with a three-dimensional dendritic microstructure and the ratio of the weight of the silver particles with a three-dimensional dendritic microstructure to the total weight of the conductive particles can be 0.05:1; or can also be 0.95:1; or can be any one in between such as 0.7:1 etc. In addition, the silver particles with a three-dimensional dendritic microstructure are characterized by a specific surface area limited within a range of 0.2~3.5 m$^2$/g, and the spherical silver particles are characterized by particle sizes varied in a range of 0.1~50.0 μm.

Optionally, the conductive particles are a mixture of spherical silver particles, flaky silver particles, and silver-coated copper particles with a three-dimensional dendritic microstructure. A mass ratio of the flaky silver particles to the total mass of the spherical silver particles and the flaky silver particles is one selected from (0.3~0.7):1. The epoxy conductive paste of the present disclosure contains flaky silver particles and spherical silver particles, and the ratio of the weight of the flaky silver particles over the total weight of the spherical silver particles and the flaky silver particles can be 0.3:1, or can be 0.7:1, or can be any one in between such as 0.5:1, etc. The mass ratio of the silver-coated copper particles with three-dimensional dendritic microstructure to the total mass of the conductive particles is one selected from (0.05≠0.95):1. The conductive paste contains silver-coated copper particles with a three-dimensional dendritic microstructure and the ratio of the weight of the silver-coated copper particles with a three-dimensional dendritic microstructure to the total weight of the conductive particles can be 0.05:1; or can also be 0.95:1; or can also be any one in between such as 0.7:1 etc. In addition, the specific surface area of the silver-coated copper particles with a three-dimensional dendritic microstructure is limited within 0.2~3.5 m²/g, and the size of the spherical silver particles is varied in a range of 0.1~50.0 μm.

In some embodiments, the particle size of the silver particles with a three-dimensional dendritic microstructure is varied in a range of 0.1~50 μm.

In some embodiments, the particle size of the silver-coated copper particles with a three-dimensional dendritic microstructure is varied in a range of 0.1~50 μm.

Generally, a particle size is represented by a median size called D50. The D50 of the conductive particles with a three-dimensional dendritic microstructure is selected in the range of 0.1 μm~50.0 μm to meet all different scenarios of the epoxy conductive paste according to some embodiments of the present disclosure. In a specific embodiment, the specific surface area of the conductive particles with a three-dimensional dendritic microstructure can be 0.2 m²/g. In another specific embodiment, the specific surface area of the conductive particles with a three-dimensional dendritic microstructure can be 3.5 m²/g. In yet another specific embodiment, the specific surface area of the conductive particles with a three-dimensional dendritic microstructure can be 2.0 m²/g, etc. This is because the specific surface area of the conductive particles may affect the conductivity of the conductive paste, so the specific surface area of the conductive particles with the three-dimensional dendritic microstructure of the present disclosure needs to be limited in the range of 0.2~3.5 m²/g.

Optionally, a mass ratio of the acrylic to the epoxy in the epoxy conductive paste according to some embodiments of the present disclosure is 0.2:30 to 2:20, which means that the mass ratio of the acrylic to the epoxy can be 0.2:30. Optionally, the mass ratio of the acrylic to the epoxy can be 2:20. Optionally, the mass ratio of the acrylic to the epoxy can also be 1:20 etc.

Optionally, the epoxy used in epoxy conductive paste of the present disclosure is selected from at least one of bisphenol A-type epoxy, bisphenol F-type epoxy, naphthalene epoxy, polyurethane modified epoxy alicyclic epoxy, hydrogenated bisphenol A-type epoxy. That is to say, in the specific embodiment, the epoxy can be any one of the above-mentioned epoxy monomers, or it can be any two or a combination of two or more of the above-mentioned epoxy monomers.

The bisphenol A-type and bisphenol F-type epoxies used in epoxy conductive paste of the present disclosure are liquid epoxies with high purity and low chlorine content, with low viscosity and stable performance. The naphthalene type epoxy used in epoxy conductive paste of the present disclosure is an epoxy with a naphthalene ring structure. The introduction of the naphthalene ring structure can improve the heat resistance and dielectric properties of the epoxy, reduce water absorption, and make the epoxy to have high temperature and high humidity resistance. Among them, the typical structural formula of naphthalene epoxy is:

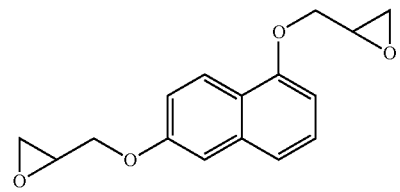 [SMILES: c1cc(OCC2CO2)c2ccc(OCC3CO3)cc2c1]

The polyurethane modified epoxy used in epoxy conductive paste of the present disclosure has good flexibility and can improve the shortcomings of ordinary epoxy after curing, such as high brittleness, poor mechanical impact resistance, poor moisture and heat resistance, low peel strength, poor low temperature resistance, etc. The polyurethane modified epoxy used in epoxy conductive paste of the present disclosure is characterized by great toughness, strong strength, and good heat resistance.

Optionally, the acrylic used in epoxy conductive paste of the present disclosure is one or a mixture of urethane acrylate and aliphatic urethane acrylate. In specific embodiments, the acrylic can be selected from one or more of the acrylates listed above according to actual needs.

Optionally, the silane coupling agent used in epoxy conductive paste of the present disclosure is at least one of 2-(3,4-epoxycyclohexyl) ethanetrimethoxy silane, 3-glycidyl ether oxypropyl methyl dimethoxy silane, 3-glycidyl ether oxypropyl propyl trimethoxy silane, 3-glycidoxy propyl methyl diethoxy silane, 3-glycidoxy propyl triethoxy silane. In specific embodiments, the silane coupling agent can be selected from one or more of the silane coupling agents listed above according to actual needs, the purpose of which is to enhance the effect of adhesion.

In addition, the silane coupling agent used in epoxy conductive paste of the present disclosure can build a "molecular bridge" between the conductive paste and the interface between the semiconductor element that needs to be bonded, such as a chip, to connect two materials with very different properties, and increase the bonding strength.

Optionally, the reactive diluent used in epoxy conductive paste of the present disclosure is at least one of aliphatic glycidyl ether 1, 6 hexanediol diglycidyl ether, C12-C14 alkyl glycidyl ether, dipropylene glycol diglycidyl ether, nonylphenol glycidyl ether, o-cresol glycidyl ether, trimethylolpropane triglycidyl ether, castor oil triglycidyl ether, and pentaerythritol tetraglycidyl ether. In specific embodiments, the reactive diluent can be selected from one or more of the reactive diluents listed above according to actual needs.

Optionally, the toughening agent used in epoxy conductive paste of the present disclosure is at least one of the core-shell rubber epoxy toughening agent, polyester polyol, and fumed silica. In specific embodiments, the toughening agent can be selected from one or more of the above listed toughening agents according to actual needs.

Optionally, the cationic curing agent used in epoxy conductive paste of the present disclosure is at least one of a dicyandiamide type epoxy curing agent, a substituted urea accelerator, a fatty amine type epoxy curing agent, a polyamide type epoxy curing agent, an imidazole type epoxy curing agent, and a Lewis acid type epoxy curing agent. In specific embodiments, the curing agent can be selected from one or more of the curing agents listed above according to actual needs, and its purpose is to initiate the curing reaction.

In a specific embodiment, the conductive particles in epoxy conductive paste of the present disclosure include one or more of silver particles having a three-dimensional dendritic microstructure, spherical silver particles, flaky silver particles, or spheroidal silver particles.

In a specific embodiment, the conductive particles in epoxy conductive paste of the present disclosure include one or more of silver particles having a three-dimensional dendritic microstructure, spherical silver-coated copper particles, flaky silver-coated copper particles, or spheroidal silver-coated copper particles.

In a specific embodiment, the conductive particles in epoxy conductive paste of the present disclosure include one or more of silver-coated copper particles having a three-dimensional dendritic microstructure, spherical silver-coated copper particles, flaky silver-coated copper particles, or spheroidal silver-coated copper particles.

In a specific embodiment, the conductive particles in epoxy conductive paste of the present disclosure include one or more of silver-coated copper particles having a three-dimensional dendritic microstructure, spherical silver particles, flaky silver particles, or spheroidal silver particles.

In a specific embodiment, the conductive particles in epoxy conductive paste of the present disclosure include one or more of silver-coated copper particles with a three-dimensional dendritic microstructure, silver particles with a three-dimensional dendritic microstructure, spherical silver-coated copper particles, flaky silver-coated copper particles, spheroidal silver-coated copper particles, spherical silver particles, flaky silver particles, or spheroidal silver particles.

In another aspect, the present disclosure provides a preparation method of the epoxy conductive adhesive described herein. The method includes the following steps:

Step 1. According to the total mass of 100 parts, weighing the following raw material components: 30~81 parts of conductive particles, 16~30 parts of epoxy, 0.2~3 parts of acrylic, 1~15 parts of reactive diluent, 1~15 parts of toughening agent, 0.4~5 parts of silane coupling agent, 0.4~5 parts of cationic curing agent;

Step 2. Mixing and stirring the epoxy, acrylic, reactive diluent, toughening agent, silane coupling agent, and cationic curing agent described in Step 1 and then adding the conductive particles, and continuing to stir until the mixture is uniform to get a mixture;

Step 3. Grinding the mixture to obtain epoxy conductive paste.

In yet another aspect, the present disclosure provides an application method of the above-mentioned epoxy conductive paste in semiconductor components for packaging a semiconductor device.

In a specific implementation, the application method of the epoxy conductive paste of the present disclosure includes first printing the epoxy conductive paste on the substrate of a semiconductor element. The application method further includes disposing the substrate printed with the epoxy conductive paste in an environment of 80° C. to 170° C. (for example, 150° C.). Next, the application method includes curing the printed epoxy conductive paste at 150° C. for 5 to 300 s (for example, 15 s) to obtain a semiconductor element containing the epoxy conductive paste of the present disclosure. After the curing reaction, the epoxy in the epoxy conductive paste turns into epoxy resin, so the epoxy conductive paste of the present disclosure is also called an epoxy resin conductive paste. Additionally, the application method includes packaging the semiconductor element via the epoxy conductive paste into a semiconductor device including solar cell.

The epoxy conductive paste according to some embodiments of the present disclosure is a heat-curing conductive paste. It is noted that the epoxy conductive paste can be cured at a temperature of 80° C.-170° C. within 1 to 500 seconds, and the epoxy conductive paste can also be stored at a room temperature of 22° C. to 25° C. for a long time. It is also noted that the epoxy conductive paste can be operated for a long time under room temperature conditions. It is further noted that the conductivity of the epoxy conductive paste is sufficient for long-term use under operation conditions of various electronic device assembly including solar photovoltaic module production. The epoxy conductive paste of the present disclosure can also form a conductive path between two substrates or components and the substrate. It is further noted that the epoxy conductive paste can be used in the manufacture and assembly of electronic equipment, integrated circuits, semiconductor devices, passive components, and solar photovoltaic modules.

In summary, the epoxy conductive paste according to some embodiments of the present disclosure uses conductive particles with a three-dimensional dendritic microstructure. The multi-point contacts formed between the two conductive particles with three-dimensional dendritic microstructure help reducing the contact resistance greatly and improving the conductivity, thereby reducing the amount of conductive particles used, reducing costs and improving performance of the conductive paste. The epoxy conductive paste involved in the present disclosure uses modified epoxy acrylic and silane coupling agents as adhesion promoters, so that the epoxy conductive adhesive shows very good application performance with fast curing speed, strong adhesion, and being capable for a long-time operation at room temperature.

The present disclosure has been described in detail with reference to preferred embodiments above, which however are not intended to limit the present disclosure. Any modifications, equivalent substitutions and improvements can be made without departing from the spirit and principle of the present disclosure, which are all fall within the protection scope of the present disclosure.

What is claimed is:

1. An epoxy conductive paste comprising, based on 100 parts by total mass, following raw material components: 30~81 parts of conductive particles, 16~30 parts of epoxy, and 0.2~3 parts of acrylic, 1~15 parts of reactive diluent, 1~15 parts of toughening agent, 0.4~5 parts of silane coupling agent, 0.4~5 parts of cationic curing agent;
    wherein the conductive particles comprise conductive particles with a three-dimensional dendritic microstructure;
    wherein the conductive particles with the three-dimensional dendritic microstructure are characterized by a specific surface area limited in a range of 0.2~3.5 m²/g.

2. The epoxy conductive paste of claim 1, wherein the conductive particles with the three-dimensional dendritic microstructure comprise silver particles with the three-dimensional dendritic microstructure or silver-coated copper particles with the three-dimensional dendritic microstructure.

3. The epoxy conductive paste of claim 1, wherein the conductive particles comprise a mixture of spherical silver particles and silver particles with the three-dimensional dendritic microstructure, wherein a mass ratio of the silver particles with the three-dimensional dendritic microstructure to total of the conductive particles is one selected from (0.05 to 0.95):1, and the spherical silver particles are characterized by particle sizes selected from 0.1~50 μm.

4. The epoxy conductive paste of claim 1, wherein the conductive particles comprise a mixture of spherical silver particles and silver-coated copper particles with the three-dimensional dendritic microstructure, wherein a mass ratio of the silver-coated copper particles with the three-dimensional dendritic microstructure to total of the conductive particles is one selected from (0.05 to 0.95):1, and the spherical silver particles are characterized by particle sizes selected from 0.1~50 μm.

5. The epoxy conductive paste of claim 1, wherein the conductive particles comprise a mixture of flaky silver particles and silver particles with the three-dimensional dendritic microstructure, wherein a mass ratio of the silver particles with the three-dimensional dendritic microstructure to total of the conductive particles is one selected from (0.05 to 0.95):1, and the flaky silver particles are characterized by particle sizes selected from 0.1~50 μm.

6. The epoxy conductive paste of claim 1, wherein the conductive particles comprise a mixture of flaky silver particles and silver-coated copper particles with the three-dimensional dendritic microstructure, wherein a mass ratio of the silver-coated copper particles with the three-dimensional dendritic microstructure to total of the conductive particles is one selected from (0.05 to 0.95):1, and the flaky silver particles are characterized by particle sizes selected from 0.1~50 μm.

7. The epoxy conductive paste of claim 1, wherein the conductive particles comprise a mixture of flaky silver-coated copper particles and silver-coated copper particles with the three-dimensional dendritic microstructure, wherein a mass ratio of the silver-coated copper particles with the three-dimensional dendritic microstructure to total of the conductive particles is one selected from (0.05 to 0.95):1, and the flaky silver-coated copper particles are characterized by particle sizes selected from 0.1~50 μm.

8. The epoxy conductive paste of claim 1, wherein the conductive particles comprise a mixture of spherical silver particles, flaky silver particles, and silver particles with a three-dimensional dendritic microstructure, and a mass ratio of the flaky silver particles or the spherical silver particles to total of the spherical silver particles and the flaky silver particles is one selected from (0.3 to 0.7):1, a mass ratio of the silver particles with the three-dimensional dendritic microstructure to total of the conductive particles is one selected from (0.05 to 0.95):1, and the spherical silver particles characterized by particle sizes varied in a range of 0.1~50 μm.

9. The epoxy conductive paste of claim 1, wherein the conductive particles comprise a mixture of spherical silver particles, flaky silver particles, and silver-coated copper particles with a three-dimensional dendritic microstructure, wherein a mass ratio of the flaky silver particles or the spherical silver particles to total of the spherical silver particles and the flaky silver particles is one selected from (0.3~0.7):1, a mass ratio of the silver-coated copper particles with the three-dimensional dendritic microstructure to total of the conductive particles is one selected from (0.05~0.95):1, and the spherical silver particles characterized by particle sizes varied in a range of 0.1~50 μm.

10. The epoxy conductive paste of claim 2, wherein the silver particles with the three-dimensional dendritic microstructure are characterized by sizes varied in a range of 0.1~50 μm; the silver-coated copper particles with the three-dimensional dendritic microstructure are characterized by sizes varied in a range of 0.1~50 μm.

11. The epoxy conductive paste of claim 1, wherein a mass ratio of the acrylic to the epoxy is one selected from a range of 0.2:30~2:20.

12. The epoxy conductive paste of claim 1, wherein the epoxy is at least one of bisphenol A-type epoxy, bisphenol F-type epoxy, naphthalene epoxy, polyurethane modified epoxy, cycloaliphatic epoxy, hydrogenated bisphenol A-type epoxy.

13. The epoxy conductive paste of claim 1, wherein the acrylic is one or a mixture of urethane acrylate and aliphatic urethane acrylate;
a mass ratio of the acrylic to the epoxy is one selected from a range of 0.2:30~2:20.

14. The epoxy conductive paste of claim 1, wherein the silane coupling agent is at least one of 2-(3,4-epoxycyclohexyl) ethanetrimethoxy silane, 3-glycidyl ether oxypropyl methyl dimethoxy silane, 3-glycidyl ether oxypropyl trimethoxy silane, 3-glycidoxy propyl methyl diethoxy silane, and 3-glycidoxy propyl triethoxy silane.

15. The epoxy conductive paste of claim 1, wherein the reactive diluent is at least one of aliphatic glycidyl ether 1,6 hexanediol diglycidyl ether, C12-C14 alkyl glycidyl ether, dipropylene glycol diglycidyl ether, nonylphenol glycidyl ether, o-cresol glycidyl ether, trimethylolpropane triglycidyl ether, castor oil triglycidyl ether, and pentaerythritol tetraglycidyl ether.

16. The epoxy conductive paste of claim 1, wherein the toughening agent is at least one of core-shell rubber epoxy toughening agent, polyester polyol, and fumed silica.

17. The epoxy conductive paste of claim 1, wherein the cationic curing agent is at least one of dicyandiamide epoxy curing agent, substituted urea accelerator, fatty amine epoxy curing agent, and polyamide epoxy.

18. A method of using the epoxy conductive paste according to claim 1 comprising:
printing the epoxy conductive paste on a substrate of a semiconductor element;
disposing the substrate printed with the epoxy conductive paste in an environment of 80° ° C. to 170° C.;
curing the epoxy conductive paste at 150° C. for 5 to 300 seconds; and packaging the semiconductor element via the epoxy conductive paste into a semiconductor device.

* * * * *